(12) United States Patent
Dietz

(10) Patent No.: US 8,311,534 B2
(45) Date of Patent: Nov. 13, 2012

(54) ROAMING IN TELECOMMUNICATION NETWORKS

(75) Inventor: Jan Berend Dietz, Gouda (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 268 days.

(21) Appl. No.: 12/742,917

(22) PCT Filed: Nov. 13, 2008

(86) PCT No.: PCT/NL2008/050723
§ 371 (c)(1),
(2), (4) Date: Aug. 23, 2010

(87) PCT Pub. No.: WO2009/064182
PCT Pub. Date: May 22, 2009

(65) Prior Publication Data
US 2011/0045798 A1   Feb. 24, 2011

(30) Foreign Application Priority Data

Nov. 13, 2007 (EP) .................................... 07120545
Jan. 30, 2008 (EP) .................................... 08150846

(51) Int. Cl.
*H04W 4/00* (2009.01)
*H04W 36/00* (2009.01)

(52) U.S. Cl. ............... 455/432.1; 455/435.1; 455/436; 455/440

(58) Field of Classification Search ............... 455/432.1, 455/435.1, 436, 440
See application file for complete search history.

(56) References Cited

U.S. PATENT DOCUMENTS

| | | | |
|---|---|---|---|
| 6,405,042 B1 * | 6/2002 | Akhteruzzaman et al. | ... 455/445 |
| 7,245,912 B1 * | 7/2007 | Fenton et al. | ................. 455/433 |
| 7,272,392 B2 * | 9/2007 | Boda | ......................... 455/432.1 |
| 7,555,107 B2 * | 6/2009 | Anupam et al. | ......... 379/201.02 |

FOREIGN PATENT DOCUMENTS

EP   1 819 178   8/2007

OTHER PUBLICATIONS

International Search Report for PCT/NL2008/050723, mailed on Feb. 13, 2009, 2 pages.

* cited by examiner

*Primary Examiner* — Marisol Figueroa
(74) *Attorney, Agent, or Firm* — Morrison & Foerster LLP

(57) ABSTRACT

A method of providing telecommunication services in next generation networks involves at least one landline terminal (3). The terminal (3) has a home network (1) and is capable of registering via another network (2) so as to be used in the other network while charging telecommunication costs to the home network. Advantageously, the home network (1) is a private network, for example a next generation corporate network, while the other network (2) is a public network. An interface (4) between the home network (1) and the other network (2) may be constituted by a network-network interface.

10 Claims, 1 Drawing Sheet

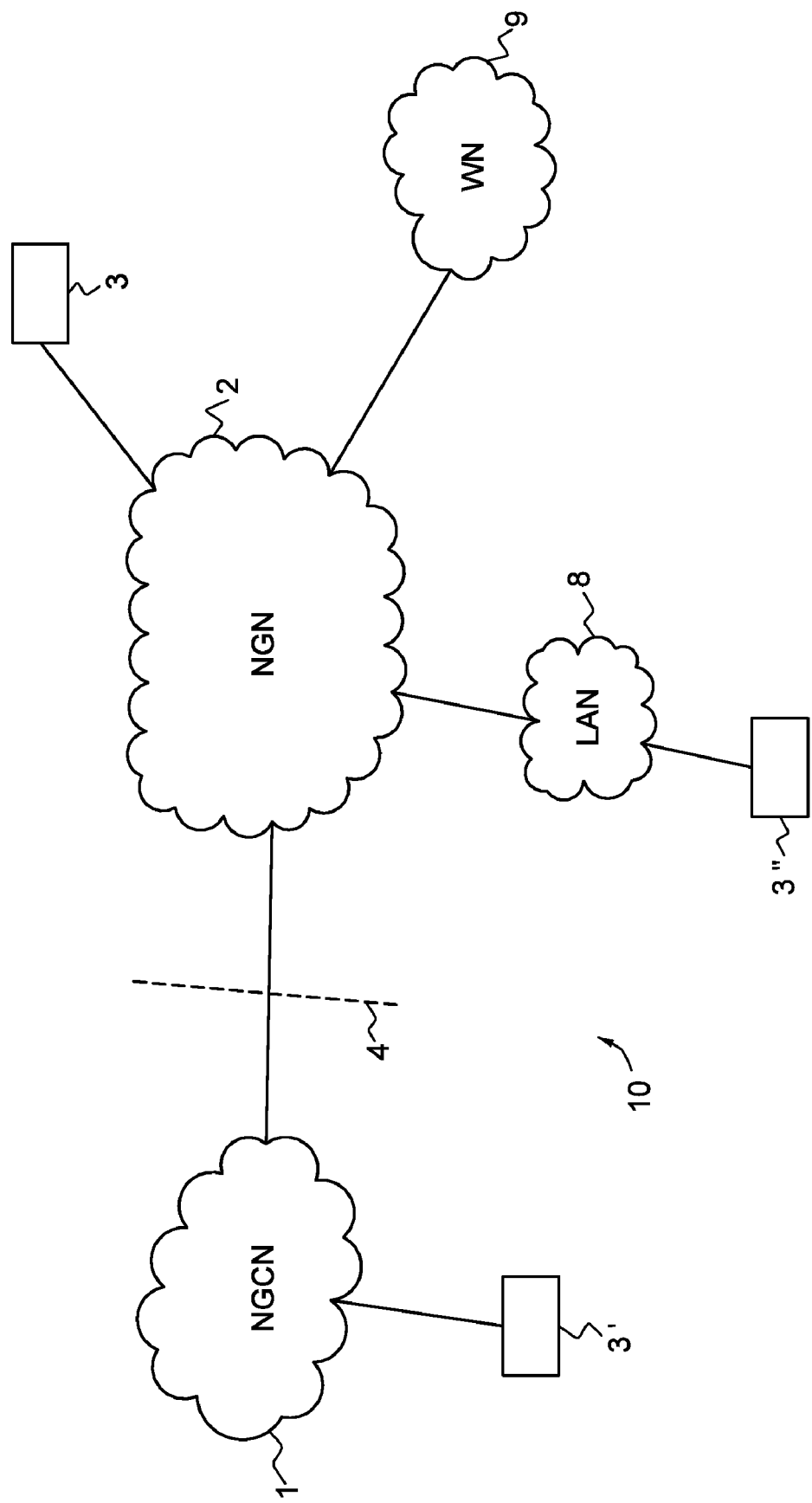

ROAMING IN TELECOMMUNICATION NETWORKS

CROSS-REFERENCE TO RELATED APPLICATIONS

This application is the national phase of PCT application PCT/NL2008/050723 having an international filing date of 13 Nov. 2008, which claims benefit of European application Nos. 07120545.4 filed 13 Nov. 2007 and 08150846.7 filed 30 Jan. 2008. The contents of the above patent applications are incorporated by reference herein in their entirety.

The present invention relates to roaming in telecommunication networks. More in particular, the present invention relates to a method of and a system for providing telecommunication services using a terminal in another telecommunication network than its own home network, which other telecommunication network preferably is a next generation network.

It is well known to provide the feature known as "roaming" in mobile (cellular) communication networks. Roaming allows a mobile terminal to register in another network than its home network and to use the facilities of the other (visited) network while typically charging any calls to its home network. Traditionally, roaming has been limited to mobile networks only.

European Patent Application EP 1 819 178 discloses a method of implementing terminal roaming in a soft-switch based next generation network (NGN) and suggests that this network is a fixed or landline (that is, not mobile) network. A terminal registers at a so-called soft switch controlling device of another network than its home network. On the basis of the terminal's user data the soft switching device determines that the terminal is visiting, checks its roaming rights, allows access to the network, and handles charges. The home network of the terminal is a public network while the other (visited) network may be a public or private network. In case the visited network is a private network, EP 1 819 178 suggests using a traversing device for different form networks.

The advantages of roaming are clear: the subscribers of a first network can visit a second network and use their terminals in the second network without having to be a subscriber of the second network or having to pay charges directly to the operator of the second network. Typically, facilities available at the first network (the subscribers' home network) are also available at the second network (the visited network). In Prior Art systems these subscribers are necessarily subscribers of public networks managed by an operator who, in principle, allows any paying subscriber access to his network. There are, however, also non-public networks, that is private networks, for use within companies and organisations. Private networks typically have restricted access and offer facilities such as abbreviated dialling and/or reduced (or zero) charges. Within office buildings, for examples, users of a private network may make free or inexpensive in-company calls using telephone numbers having only three, four or five digits. In private networks, access to the network typically is restricted to a certain location, and the advantageous features of the private network are not available from other locations, which may be served by public networks.

It is an object of the present invention to overcome these and other problems of the Prior Art and to provide a method of providing telecommunication services in next generation networks using at least one landline terminal, which method is not limited to subscribers of public networks.

It is another object of the present invention to provide a system for providing telecommunication services in next generation networks using at least one landline terminal, which system is not limited to subscribers of public networks.

Accordingly, the present invention provides a method of providing telecommunication services in next generation networks using at least one landline terminal associated with a home network, the method comprising the steps of:
connecting the terminal to another network,
checking with the home network whether the terminal may be used in the other network, and
using the terminal in the other network while utilizing facilities of the home network,
wherein at least one of the home network and the other network is a next generation network, characterised in that the home network is a private network, so that the at least one landline terminal may utilize facilities of the private network while being connected to the other network.

By allowing the other or visited network to utilize facilities of the private home network while being connected to another network, subscribers of private networks can also roam, similar to subscribers of public networks. This offers subscribers of private networks an increased degree of freedom. Employees of a company that has a private network will be able to use their terminals both at their home location, for example the company's head office, and at other locations, for example at branch offices using the local private networks or at other locations outside the head office using the public network. The facilities the terminal may utilize while being connected to another network preferably include billing, that is, charging the telecommunication costs to its private home network.

The home network the terminal is associated with typically has previously been assigned to the terminal It allows the terminal to make calls and use other services, and typically takes care of the billing for the terminal. While the terminal has a home network, it is capable of registering in its home network via another network. This registering via another network allows the terminal to be used in the other network while charging telecommunication costs to the home network.

Whether the terminal may be used in another network, and is therefore allowed to register via another network, is preferably determined by the terminal's roaming credentials. Such roaming credentials may be defined by a roaming agreement between the visited network and the home network, the agreement setting out the various facilities available in the visited network and/or any charging arrangements. Roaming protocols, which may be know per se, can be applied to the roaming of landline terminals according to the present invention.

It will be understood that a landline or fixed terminal is contrasted with a mobile or cellular terminal. Although the landline terminal may have wireless access to a network (e.g. using a Bluetooth© or other wireless connection), it still has access to a fixed network, in contrast with a mobile network which includes antenna masts and terminals capable of wirelessly communicating with the antenna masts.

When registered via another network, the terminal may not only be able to charge telecommunication costs to the home network but may additionally, or alternatively, be able to use other facilities of the home network, such as abbreviated dialling (company number plan). More in particular, the step of using the terminal in the other network may further involve providing facilities of the home network, while the facilities of the home network may comprise abbreviated dialling and/ or voice mail. This further increases the benefits of the terminal users. Other facilities may include certain quality levels, for example speech quality levels and failure rates.

In a preferred embodiment, the home network is a next generation corporate network (NGCN).

In one embodiment, the other (or visited) network is a public network, while in another embodiment, the other network is a private network. In further embodiments, a plurality of other networks may be used, some of which may be public and some of which may be private.

Between networks, interfaces are typically provided to facilitate the data transfer between the networks, for example using the Session Initiation Protocol (SIP). In accordance with another aspect of the present invention, an interface between the home network and the other network preferably is a network-network interface (NNI). In the Prior Art, the interface used between a private and a public network is a user-network interface (UNI) which assumes that the private network is just a subscriber of the public network and not another network having its own subscribers. In the present invention, in contrast, the network-network interface (NNI) regards both the private network and the public network as service providers.

The present invention additionally provides a system for providing telecommunication services using at least one landline terminal, the system comprising:

a home network associated with the terminal, and another network in which the terminal may be used while using facilities of the home network after checking with the home network whether the terminal may be used in the other network, wherein at least one of the home network and the other network is a next generation network, characterised in that the home network is a private network, so that the at least one landline terminal may utilize facilities of the private network while being connected to the other network.

The system of the present invention provides the same advantages as the method defined above.

In a preferred embodiment of the system according to the present invention, using the terminal in the other network further involves charging costs to the home network. An interface between the home network and the other network may be a network-network interface, while the other network may be a public network.

The present invention will further be explained below with reference to exemplary embodiments illustrated in the accompanying drawing, in which:

FIG. 1 schematically shows an embodiment of a telecommunication system according to the present invention.

The telecommunication system 10 shown merely by way of non-limiting example in FIG. 1 comprises a first (or home) network 1, an second (or other) network 2, and landline terminals 3 and 3'. An interface 4 is present between the first network 1 and the second network 2. The system 10 may further comprise a third (or local area) network 8 with an associated landline terminal 3", and a fourth (or world) network 9. In the example shown, both the local area network (LAN) 8 and the fourth (or world) network (WN) 9 are coupled to the second network 2.

For both terminal 3 and terminal 3', the first network 1 is their home network: these terminals can be used within the first network 1 without the need for any additional measures, and any telecommunication charges incurred by the terminals will be incurred by the operator of the first network. Typically, the users of the terminals will have subscriptions provided by the operator of the first network.

In accordance with the present invention, the home network 1 is a private network, such as a company network. The home network 1 can be constituted by, for example, a local area network (LAN) or an IP-based private network (IP-PBX), in particular a next generation corporate network (NGCN). In addition, the terminals are able to roam: they can register in the first network 1 via other networks, such as the second network 2, and use telecommunication facilities offered by the first network 1 via the second network 2. In some embodiments, the second network will be capable or allowed to offer only some facilities of the first network, for example only voice calls, while in other embodiments the second network will offer all facilities of the first (home) network to visiting (that is, roaming) terminals.

The registration of a terminal in the home network via another network may involve establishing a connection with the home network via the other network and notifying the home network of the fact that the terminal is connected to the other network. An identification of the other (visited) network, together with other data such as a terminal and/or subscriber identification, is registered at the home network.

Facilities offered by the home network 1 and, in the case of roaming, possibly also by the second network 2 may include abbreviated dialling, call forwarding, and similar services. Both offering these facilities and charging of telecommunication costs to the home network are preferably carried out under a roaming agreement, as is typical between operators of mobile telecommunication networks.

In the example of FIG. 1, the terminal 3 is registered via the second network 2. In this particular example, the second network 2 is a next generation network (NGN). The terminal 3 is a landline terminal which may register via the second network 2 by requesting an IP address when physically present in the service area of the second network. The terminal 3 may make a physical connection with the second network by using a suitable connector, or may make a wireless connection using a Bluetooth© or other wireless link. In either case, a landline connection will be established.

Although the terminals 3 and 3' are called landline terminals, that is, terminals suitable for use in landline (fixed) networks such as PSTN (Public Switched Telephone Network), they may additionally be suitable for use in mobile (cellular) networks, such GSM (Groupe Spéciale Mobile) and UMTS (Universal Mobile Telecommunication System) networks. However, the present invention is directed at their landline telecommunication features, not at their mobile features.

It will be clear from FIG. 1 that the service areas of the two network have no overlap and that, at the location of terminal 3, the first network 1 is inaccessible. In contrast, the terminal 3' is located within the service area of the first network 1 and is capable of registering in the first network 1. Terminal 3, when registered via the second network 2 as being in the second network 2, will then be able to communicate with terminal 3' when the latter is registered in its home network 1 as being in the home network 1. Terminal 3 will also be able to communicate with other terminals (not shown) in network 1, network 2 or other networks, such as the local area network 8. Any charges incurred by terminal 3 when registered via the second network 2 are, in the preferred embodiment, borne by the operator of the first (home) network 1.

It will be clear that the terminal 3 can de-register via the second network 2 and thereby give up its local telecommunication facilities. The terminal 3 may move back to its home network 1 and re-register, or move on to a further network and re-register via this further network.

The first network 1 and the second network 2 are interconnected so as to be able to communicate, preferably using the Session Initiation Protocol (SIP). Conventionally, the interface between a private network (such as network 1) and a public network (such as network 2) is a User Network Interface (UNI), which is a demarcation point between the responsibility of the service provider and the responsibility of the subscriber. However, according to a further aspect of the present invention, another type of interface is preferably used: a Network-Network Interface (NNI) that defines a demarcation point between provider networks. Accordingly, in preferred embodiments of the present invention the private network 1 is treated as a provider network, as distinct from a subscriber network. By treating private networks as provider networks, roaming of landline terminals in public networks, or in other private networks, is greatly facilitated. The interface 4 in the exemplary embodiment of FIG. 1 therefore is a network-network interface (NNI).

As mentioned above, the terminals of the first network 1 may roam in two or more other networks, some of which may be overlapping.

The present invention is based upon the insight that a private network may be based upon the same principles as public networks and may therefore also be used as a service provider network whose clients roam in other networks. The present invention benefits from the further insight that roaming is not only possible in mobile networks but also in landline networks, in particular next generation landline networks (NGNs).

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents. Neither the home network nor the other, visited network, needs to be a next generation network, although such networks are used in the preferred embodiments.

It will therefore be understood by those skilled in the art that the present invention is not limited to the embodiments illustrated above and that many modifications and additions may be made without departing from the scope of the invention as defined in the appending claims.

The invention claimed is:

1. A method of providing telecommunication services in next generation networks using at least one landline terminal (3) associated with a first network (1), as home network, the first network (1) being a private network supporting abbreviated dialing using a company number plan defined in the first network (1) as a facility of the first network (1), the method comprising the steps of:
   connecting the landline terminal to a second network (2) external to the first network (1),
   registering the landline terminal (3) in the first network (1) via the second network (2) when the landline terminal (3) is connected to the second network (2), after checking with the first network (1) whether the landline terminal (3) may be used in the second network (2),
   using the landline terminal in the second network (2) while utilizing facilities of the home network (1), and
   offering the abbreviated dialing facility so that the at least one landline terminal (3) may utilize facilities of the private network to the landline terminal (3) while the landline terminal (3) is being connected to the second other network (2),
   wherein at least one of the first network (1) and the second network (2) is a next generation network.

2. The method according to claim 1, wherein the facilities of the first network (1) offered to the landline terminal (3) while connected to the second network (2) comprise charging telecommunication costs made by the landline terminal (3) while connected to the second network to the first network.

3. The method according to claim 1, wherein the facilities of the first network (1) offered to the landline terminal (3) while connected to the second network (2) comprise using voice mail.

4. The method according to claim 1, wherein the first network (1) is a next generation corporate network.

5. The method according to claim 1, wherein the second network (2) is a public network.

6. The method according to claim 1, wherein the second network (2) is a private network.

7. The method according to claim 1, wherein an interface (4) between the first network (1) and the second network (2) is a network-network interface.

8. The method according to claim 1 wherein the offering of the abbreviated dialing facility to the first network (1) is carried out under a roaming agreement.

9. A system (10) for providing telecommunication services using at least one landline terminal (3), the system comprising:
   a first network (1) associated with the terminal as a home network, the first network (1) being a private network supporting abbreviated dialing using a company number plan defined in the first network (1) as a facility of the first network (1), and
   a second network (2) via which the terminal can be registered in the first network (1), to utilize facilities of the first network (1) after checking with the first network (1) whether the terminal may be used in the second network (2), wherein at least one of the first network (1) and the second network (2) is a next generation network,
   wherein the first network (1) is configured to offer the abbreviated dialing facility of the private network to the landline terminal (3) while to the landline terminal (3) is connected to the second network (2).

10. The system according to claim 9, wherein an interface (4) between the first network (1) and the second network (2) is a network-network interface.

* * * * *